United States Patent [19]

Stuckmann et al.

[11] Patent Number: 5,458,778
[45] Date of Patent: Oct. 17, 1995

[54] METHOD OF TREATING WASTE WATER FROM A CAR WASH AT A VEHICLE REFUELING STATION

[75] Inventors: Otto Stuckmann, Recklinghausen; Detlev Sassin, Dortmund, both of Germany

[73] Assignee: Partner GmbH, Recklinghausen, Germany

[21] Appl. No.: 184,248

[22] Filed: Jan. 18, 1994

[30] Foreign Application Priority Data

Dec. 23, 1992 [DE] Germany ............................ 42 43 651.6
Dec. 16, 1993 [EP] European Pat. Off. .............. 93120247

[51] Int. Cl.⁶ ...................................................... C02F 3/30
[52] U.S. Cl. .......................... 210/603; 210/605; 210/608; 210/612; 210/621
[58] Field of Search ........................ 210/605, 608, 210/621–623, 630, 631, 703, 603, 612, 712, 737

[56] References Cited

U.S. PATENT DOCUMENTS 4,976,863  12/1990  Stearns ..................................... 210/608
5,236,595  8/1993   Wang et al. .............................. 210/703
5,250,189  10/1993  Rey .......................................... 210/712
5,310,485  5/1994   Roshanravan ........................... 210/605
5,364,529  11/1994  Morin et al. ............................. 210/608

FOREIGN PATENT DOCUMENTS 0302852    8/1988   European Pat. Off. .
4225900    8/1991   European Pat. Off. .
3501175    7/1986   Germany .
3834070    4/1990   Germany .
3834071    4/1990   Germany .
3834072    4/1990   Germany .
4038605A1  9/1992   Germany .

*Primary Examiner*—Thomas Wyse
*Attorney, Agent, or Firm*—Herbert Dubno

[57] ABSTRACT

A vehicle refueling station has a water treatment system for the vehicle washing installation which utilizes mechanical flotation and an aerobic treatment of the flotage to minimize sewer discharge. The gas from the anaerobic treatment is used to fuel a thermal electric converter which can also be fueled by vapors from the fueling operation. The thermal energy can be used to heat the water for car washing or for space heating purposes. The electrical energy can drive the electrical equipment at the refueling station.

8 Claims, 1 Drawing Sheet

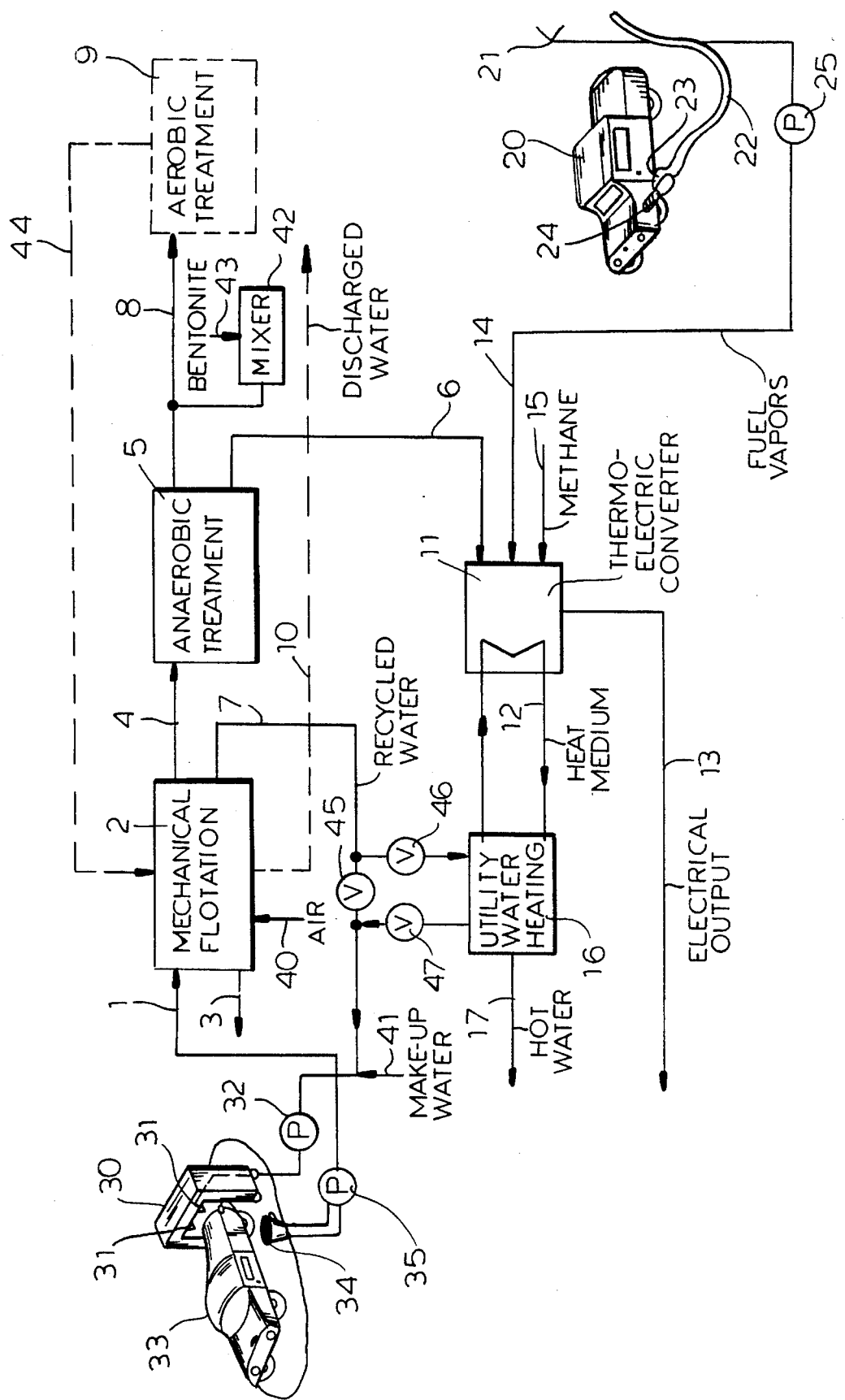

METHOD OF TREATING WASTE WATER FROM A CAR WASH AT A VEHICLE REFUELING STATION

SPECIFICATION

1. Field of the Invention

Our present invention relates to a method of or a process for the treatment of waste water derived from the washing of motor vehicles or the like, particularly at refueling stations. The invention also relates to a method of treating fuel vapors recovered at such refueling stations.

2. Background of the Invention

It is not uncommon to provide at a vehicle refueling station, in addition to the fuel pumps which can have hoses with nozzles which are intended to be inserted into the fuel pipe of the vehicle, means for evacuating fuel vapors from the tank as the latter is filling as a safety precaution and to eliminate emission of hydrocarbons as an environmental pollutant, into air. It is also not uncommon to provide at such a refueling station, a facility for washing the automotive vehicle, e.g. in the form of a drive-through arrangement, in the form of a frame or portal which can be drawn over the vehicle, or in the form of a facility provided with spray nozzles and/or brushes enabling manual washing of the vehicle.

All of the latter facilities are provided with drains for collecting the wash water and it has been common practice in the past to simply discharge the collected waste water into a sewer line, possibly after removal of oil which may be entrained therein.

With increasing restrictions on what might be released into sewer lines, the discharge of such waste waters has become problematical. Furthermore, economic factors and concern for the environment requires as much as possible the maximization of energy recovery and elimination of release of contaminants into the environment.

OBJECTS OF THE INVENTION

It is, therefore, the principal object of the present invention to provide an improved method of treating waste water, especially waste water recovered from an installation for the washing of automotive vehicles at a refueling station, which minimizes the need for fresh water for the washing installation, reduces the energy input required for the system and reduces any discharges into the environment which may be hazardous or can be considered to be a load on the environment.

Another object of the invention is to provide an improved method of disposing of the fuel vapors recovered at a refueling station.

It is also an object of the invention to provide an improved method of treating waste water of the type described which enables maximum utilization of any energy content thereof.

SUMMARY OF THE INVENTION

These objects are attained, in accordance with the present invention in which the waste water recovered from the washing of automotive vehicles at a refueling station is subjected to flotation in a station stage with bottom discharge of sediments, the decanted flotation product or flotate being fed to an anaerobic treatment stage in which the organic constituents of the flotate are decomposed at least in part into fermentation gases (biogas) and sewer gas. The clarified effluent from the anaerobic treatment stage is recycled to the automotive vehicle washing installation to reduce the fresh water requirements thereof.

Advantageously, the flotation unit operates without the use of a flocculent or flocculating agent. Mention may be made especially of the device disclosed in German Patent 35 01 175. According to the invention, air bubbles of a diameter of 20 to 40 microns, especially about 30 microns are generated in the suspension in this flotation stage so that because of the difference in surface potentials, a decanting of floating organic and other contaminants is possible. Air can be introduced for this purpose and the bubbles can be formed by expansion of air under pressure into the suspension.

An apparatus of this type can be operated with low gas because of the elimination of the need for addition of chemicals to promote or effect the flotation and because of reduced disposal costs. In practice it has been found that the amount of material to be decomposed of, i.e. the bottom discharge from the flotation stage, is about 16% of the mass hitherto requiring disposal, largely because of the elimination of the need for flocculating agents. The primary content of the bottom discharge is sedimental solids which are in effect street dirt and do not generally pose environmental problems. The maintenance costs are reduced by the use of mechanical flotation.

The flotate is treated, as noted, at least initially in an anaerobic treatment stage. In this treatment stage the organic substances are converted into biogas or sewer gas. This results in a reduction in the mass of decomposable contaminants which hitherto have been discharged into sewer systems by about 50% and permits approximately 0.3 m$^3$ of biogas with an average heating value of 5500 kcal/m$^3$ to be obtained per kilogram of dry organic mass contained in the suspension processed in the anaerobic treatment stage.

According to a feature of the invention, the residue from the anaerobic treatment stage can be combined with bentonite as a binder and subject to landfill disposal. The sludge to which the bentonite is added does not represent a significant environmental hazard.

Alternatively, the product from the anaerobic treatment stage can be subjected to aerobic sludge treatment. As a consequence, the organic content can be reduced to about 10% in the anaerobic treatment stage and the sludge can be converted into a highly flowable product in the aerobic stage and this product returned to the flotation stage. The organics are finally discharged into the sewer line and can be 10% or less of those originally present in the waste water treated.

In practice it has been found to be advantageous to collect the final sludge with a surface vehicle from the various refueling stations and directly to equip the vehicle with a decanter and drier so that the solids will ultimately be disposed of in a landfill as a dry inert granulate and the liquid phase returned to the refueling station for use in further washing with a clarified effluent. Alternatively, the inert granulate can be burned to recover any heat values thereof. It has been found to be advantageous to employ the granulate as an additive for an electric power plant fuel or as a gasifiable material for the generation of synthesis gas.

If the granulate has low fuel value, with the addition of bentonite as described, it can be used as an aggregate for incorporation into concretes or asphalts or as a filler in building or construction sites.

According to a feature of the invention, the hydrocarbon vapors extracted at a refueling station during the filling of vehicle tanks with fuel are subjected to thermo-electric conversion together with the biogas or sewer gas. The thermoelectric converter is preferably a Stirling machine (see German patent 38 34 070, 38 34 071 or 38 34 072) capable of transforming the vapors and gas into heat and electricity.

The energy thus made available optimizes energy in the form of biogas or sewer gas produced in the anaerobic treatment stage and enables the thermo-electric converter to eliminate gasoline vapors and other hydrocarbons which current law requires be prevented from entering the atmosphere. The entire refueling station, therefore, has an optimum energy utilization.

The heat produced by thermal electric converter can be utilized to heat utility water and the heat exchanger provided for this purpose can be utilized to heat the clarified effluent fed to the washing station. For that purpose, the clarified effluent can at least in part be passed through the heat exchanger.

The process of the invention, therefore, comprises the steps of:

(a) deriving a waste water from a washing of automotive vehicles;

(b) subjecting the waste water derived in step (a) as a suspension to a flotation in a flotation stage, thereby decanting a flotation product, and discharging a bottom product from the flotation stage;

(c) decomposing the flotation product decanted from the flotation stage in an anaerobic treatment stage, thereby breaking down organic constituents of the decanted flotation product and producing a decomposition gas; and (d) recovering a clarified effluent from the flotation stage and recycling the clarified effluent as at least part of a washing water to the washing of automotive vehicles.

The method can also be considered to comprise:

(a) recovering fuel vapors from a refueling of automotive vehicles at a refueling station; and (b) converting the vapors and a decomposition gas into heat and electricity in a thermoelectric converter.

BRIEF DESCRIPTION OF THE DRAWING

The above and other objects, features, and advantages will become more readily apparent from the following description, reference being made to the accompanying drawing, the sole Figure of which is a flow diagram illustrating the principles of the invention.

SPECIFIC DESCRIPTION

In the drawing we have shown a refueling station for automotive vehicles, e.g. the vehicle 20 which can include a metering pump 21 and the usual hose 22 with a pistol-shaped nozzle 23 for introducing the fuel, e.g. gasoline, into the filler pipe of the vehicle 20. As is now common practice in those jurisdictions which forbid hydrocarbon emissions into the environment, a bellows-like sleeve 24 is provided on the filler nozzle 23 and communicates with a duct in the pipe 22 to enable hydrocarbon vapors to be drawn off by a blower or the like represented at 25.

The refueling station can also include a vehicle washing installation which can comprise a portal or frame 30 with nozzles 31 supplied with the washing water via a pump 32 to wash the vehicle 33 by drawing the frame over the vehicle. Alternatively the vehicle may pass through a washing container or may be washed by hand utilizing a nozzle controlled by an individual. In any event, the waste water is collected by appropriate means, e.g. the drain 34 and can be displaced by a pump 35. The pumps 25, 32, 35 and the fuel pump 21 can be electrically operated, e.g. by the electrical output represented at 13.

The system for treating the washing water collected at 34 can include a flotation stage 1 to which the water is supplied together with air sufficient to generate air bubbles of a size of 20 to 40 microns in the suspension. If necessary, additional air may be supplied at 40.

The flotation stage 2 can have a bottom discharge 3 from which sediment is removed, the sediment being discharged into the sewer system or being collected for further processing as may be desired.

The flotage is fed at 4 from the flotation stage 2 to an anaerobic treatment stage 5 in which the organic constituent of the flotage are at least partly decomposed into biogas or sewer gas 6.

The clarified effluent 7 from the flotation stage is recycled via the pump 32 to the nozzles 31 to participate in the vehicle washing operation. Make-up water can be added at 41 but is minimal. The flotage from the anaerobic treatment stage 5 can be directly converted into a solid by mixture with bentonite in a mixer and granulator 42, the bentonite addition being represented at 43.

Alternatively, the flotage at 8 can be subjected to aerobic treatment in an aerobic treatment stage 9 with the outflow from this aerobic treatment being returned to the flotation stage 2 as represented at 44. Excess water may be discharged from the flotation stage at 10.

The biogas or sewer gas 6 which is generated in the anaerobic treatment stage 5 is converted in a thermo-electric converter 11 into heat which can be recovered in the form of a circulating heating medium at 12 and the electrical energy which is outputted at 13. The thermo-electric converter 11 can be a Stirling machine driving an electric generator.

The thermo-electric converter 11 is also partly fueled by the hydrocarbon vapors 14 extracted at the refueling station and supplied by the blower 25 and, optionally also with methane (natural gas) as represented at 15.

The thermal energy produced by the thermo-electric converter 11 is supplied to a heat exchanger and utility water storage vessel 16. Via the clarified effluent line 7 and valves 45, 46 and 47, all or part of the clarified water may be passed through the water heater and storage unit 16 to heat the vehicle washing water. Hot water 17 for other purposes at the refueling station can also be withdrawn from unit 16.

The thermo-electric converter 11 can also be provided only for the conversion of fuel vapors 14 in which case the hot water output 17 can be utilized for space heating at the refueling station and the electrical energy to operate the refueling station. Additional input of fuel in the form of the natural gas 15 or some other fuel will also be required in this case.

We claim:

1. A process for treating waste water, comprising the steps of:

(a) deriving a waste water from a washing of automotive vehicles;

(b) subjecting the waste water derived in step (a) as a suspension to a flotation in a flotation stage, thereby decanting a flotation product, and discharging a bottom product from said flotation stage;

(c) decomposing the flotation product decanted from said flotation stage in an anaerobic treatment stage, thereby breaking down organic constituents of the decanted flotation product and producing a decomposition gas; and (d) recovering a clarified effluent from said flotation stage and recycling said clarified effluent as at least part of a washing water to the washing of automotive vehicles.

2. The process defined in claim 1, further comprising the step of generating air bubbles of a size of 20 to 40 μm in said suspension in said flotation stage.

3. The process defined in claim 1, further comprising the step of:

(e) withdrawing a further suspension from said anaerobic treatment stage;

(f) subjecting said further suspension to an aerobic treatment in an aerobic treatment stage; and (g) feeding a product of aerobic treatment in said aerobic treatment stage back to said flotation stage.

4. The process defined in claim 3, further comprising the step of converting said decomposition gas into heat and electricity in a thermoelectric converter.

5. The process defined in claim 4, further comprising the step of fueling said converter in part with fuel vapors recovered at a refueling station for automotive vehicles.

6. The process defined in claim 5 wherein said thermoelectric converter is a Stirling machine.

7. The process defined in claim 5, further comprising the step of heating water with heat generated by said thermoelectric generator.

8. The process defined in claim 7 wherein said clarified effluent is heated at least in part with heat generated by said thermoelectric generator.

* * * * *